June 15, 1948.  R. W. KREBS  2,443,190
CONTACTING SOLID PARTICLES WITH GASEOUS FLUIDS
Filed March 21, 1944

Robert W. Krebs INVENTOR
BY P. L. Young ATTORNEY

Patented June 15, 1948

2,443,190

UNITED STATES PATENT OFFICE 2,443,190

CONTACTING SOLID PARTICLES WITH GASEOUS FLUIDS

Robert W. Krebs, Baton Rouge, La., assignor to Standard Oil Development Company, a corporation of Delaware Application March 21, 1944, Serial No. 527,404

5 Claims. (Cl. 196—52)

This invention relates to contacting gaseous fluids with divided solids.

In certain catalytic reactions with organic compounds, combustible material is deposited on the catalyst or contact particles and the particles must be regenerated before being used over again as a catalyst or contacting agent. In the catalytic cracking of hydrocarbons, coke or carbonaceous material is deposited on the catalyst particles and the fouled or spent catalyst particles are regenerated by burning with air or oxygen-containing gas.

As the catalyst or contact particles are adsorbent, they contain adsorbed hydrocarbons, and when the catalyst or contact particles are passed to the regeneration zone, the adsorbed hydrocarbons are burned along with the coke or carbonaceous material. As the burning gives off heat, the temperature during regeneration must be carefully controlled to prevent overheating of the catalyst particles. When the hydrocarbon feed being cracked is a high coke-forming stock and the fouled or spent catalyst particles contain adsorbed hydrocarbons in addition to a large amount of coke or carbonaceous material, there is danger of overheating the contact or catalyst particles.

Especially is this true when the hot regenerated catalyst particles are used in a sufficient amount to vaporize liquid oil or partly liquid and partly vaporized oil and to supply the heat of cracking, as the cracking and regeneration zones must be kept in heat balance where heat is not removed from the regeneration zone during the regeneration operation. Also, by having more combustible material present on the catalyst or contact particles, the time of regeneration is increased.

Preferably, the fouled or spent catalyst is stripped with a stripping gas to purge the catalyst or contact particles or strip these particles of adsorbed hydrocarbons. These hydrocarbons may then be separately condensed and used as part of the feed stock or they may be returned in vapor form to the cracking zone or combined with the cracked products.

According to this invention, the spent catalyst particles are withdrawn from a cracking zone or contacting zone and passed to a stripping zone before they are introduced into a regeneration zone. The entrance to the stripping zone comprises a relatively narrow passageway which is constricted, partially obstructed, or provided with baffles to increase the catalyst dispersion and decrease oil entrainment before the catalyst goes to the stripping zone or main portion of the stripping zone.

In the preferred form of the invention, the fouled or spent catalyst leaves the bottom of the reactor in a relatively dense fluidized or dry liquid-like condition, and in order to prevent the entrainment of hydrocarbons in large masses of agglomerated catalyst particles, a stripping gas is passed through the fouled or spent catalyst as it is passed through the passageway and before it enters the stripping zone.

The stripping gas is introduced at one end of the passageway at a relatively high velocity to form a lighter or less dense fluidized mixture of catalyst but the velocity of the gas is insufficient to force the catalyst particles upwardly into the reaction zone. The catalyst particles flow down through the passageway and into the stripping zone. Additional stripping gas is introduced into the bottom portion of the stripping zone where most of the stripping takes place. The velocity of the additional stripping gas is low and the stripping time is relatively long. Because of the low velocity of the stripping gas, the density of the fluidized catalyst undergoing stripping in the stripping zone is high and improved stripping results from the long residence time in the stripper.

In the above form of the invention, the stripping gas is introduced into the stripping zone through a plurality of ports or holes in a perforated false bottom. The ports or holes are relatively small and at least one port per square foot of cross sectional stripping area is provided in the false bottom.

In another form of the invention, the narrow passageway, together with the constriction, obstruction, or baffles, is eliminated and only the perforated false bottom is used for introducing stripping gas into the bottom of the stripping zone.

Figure 2:
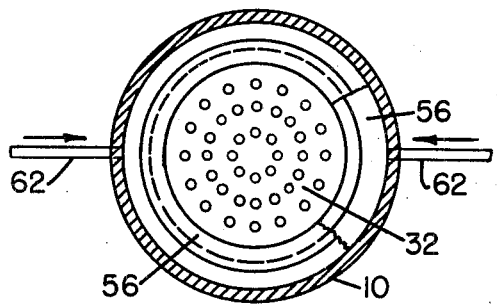
Fig. 2 represents a horizontal cross-section taken substantially on line 2—2 of Fig. 1.
Figure 1:
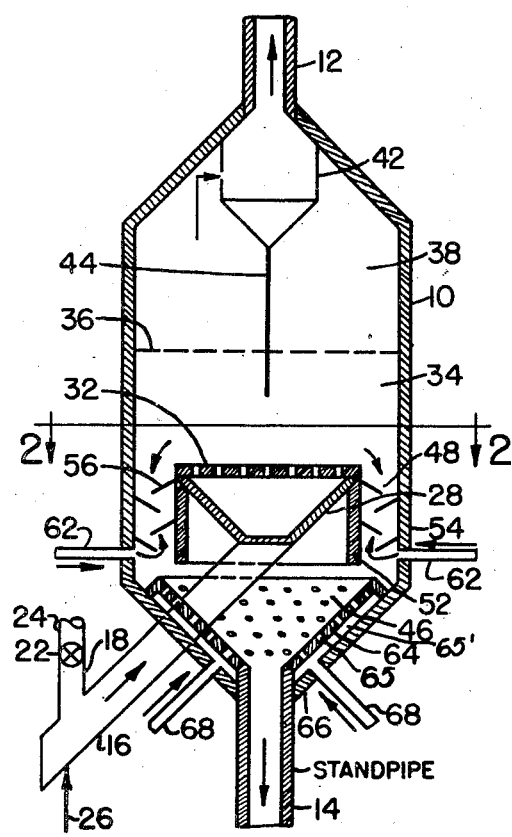
Fig. 1 represents a vertical cross-section of one form of reaction vessel provided with my improved restricted passageway leading to a stripping zone.

Referring now to Fig. 1 of the drawing, the reference character 10 designates a reaction vessel having a top outlet 12 for vaporous products or reaction products and a bottom outlet 14 for stripped catalyst. The outlet 14 forms a part of a standpipe for building up hydrostatic pressure with the fluidized stripped catalyst particles for forcing the catalyst particles into a regeneration zone (not shown). The reaction vessel 10 is provided with an inlet pipe 16 into which hot regenerated catalyst or contact particles are introduced from line 18 below valve 22. Standpipe 24 is provided with the valve 22 for controlling the amount of catalyst being discharged into the line 18. Only a portion of the standpipe 24 is shown but it will be understood that the standpipe is full of fluidized regenerated hot catalyst particles which produce a hydrostatic pressure at the base of the standpipe 24 sufficient to force a less dense catalyst-gaseous mixture through line 16 and through the reaction vessel 10.

Liquid or vaporous reactants are introduced into line 16 through line 26. Where the reactants are liquid, a sufficient amount of hot regenerated catalyst or contact particles is used to vaporize the liquid reactants and supply the heat of reaction where the reaction is endothermic. Where the reactants are in vapor form and at reaction temperature, a small amount of catalyst or contact particles may be used.

The invention is especially adapted for use in the catalytic cracking of hydrocarbons in which the hydrocarbon oil in liquid or vaporized form is introduced through line 26 and mixed with hot regenerated catalyst from the standpipe 24. Any suitable cracking catalyst may be used, such as acid-treated bentonite clays, synthetic silica alumina gels, synthetic silica magnesia gels, etc. The catalyst is preferably in powdered form having a size of about 200 to 400 mesh or finer. Sufficient hydrocarbon oil is introduced through line 26 to produce a less dense catalyst-gaseous fluid mixture in line 16 so that the hydrostatic pressure developed by standpipe 24 moves the catalyst and hydrocarbon vapors upwardly through line 16.

The inner end of pipe or line 16 is enlarged as shown at 28 and is provided with a grid or distribution member 32. The enlarged end 28 is arranged in the lower portion of the reaction vessel 10. The grid member 32 is preferably circular and has a smaller diameter than the internal diameter of the reaction vessel 10. The grid member 32 functions to distribute the catalyst particles and vapors evenly across the cross-sectional area of the reaction vessel 10.

The velocity of the hydrocarbon vapors or gases is so selected that the catalyst or contact particles are maintained in a dry fluidized condition in the reaction vessel 10 and a bed of fluidized mixture is formed as shown at 34 with a level 36. In this condition the dry fluidized mixture assumes many of the characteristics of a liquid, and in addition, the catalyst particles are maintained in a turbulent condition so that extremely good mixing and contacting between the gases and vapors and catalyst or contact particles is effected.

The gases or vapors passing upwardly through the bed 34 of fluidized catalyst are converted to desired products and the vaporous reaction products pass upwardly into the space 38 above the dense bed of catalyst. In the space 38 the reaction products in vapor form contain entrained catalyst particles but the mixture is much less dense and is referred to as the dilute phase.

When using 200 to 400 mesh acid-treated bentonite clay and with a velocity of the vapors or gases in the space 38 of about 0.5 ft./second to 1.5 ft./second, the density of the fluidized mixture shown at 34 is about 15 lbs./cu. ft. to 30 lbs./cu. ft.

The vaporous reaction products from the space 32 in the reaction vessel 10 pass through separating means 42 which is arranged in the upper portion of the reaction vessel 10. The separating means 42 is shown as a cyclone separator but other forms of separating means may be used. The separated catalyst particles are collected in the bottom of the separating means 42 and are returned to the bed of fluidized catalyst particles 34 through line 44 which extends below the level 36 in the reaction vessel 10.

The reaction products leaving the separating means 42 pass through outlet line 12 and to any desired separating equipment for separating desired fractions or products. These vaporous reaction products contain a small amount of entrained catalyst or contact particles and may be passed through additional separating means if desired. When cracking hydrocarbon oils, the vaporous reaction products passing through line 12 are passed to a fractionating tower wherein heavy ends of the cracked products are condensed and all of the entrained catalyst particles are washed out of the reaction vapors and recovered in a slurry in the bottom of the fractionating tower.

In the catalytic conversion of hydrocarbons, coke or carbonaceous material is deposited on the catalyst particles and it is necessary to regenerate the catalyst particles before using them in another conversion operation. Also the catalyst particles are adsorbent and adsorb hydrocarbon vapors or liquids. The spent or fouled catalyst particles are usually regenerated by burning the coke or carbonaceous material with air in a regeneration zone. When the coke or carbonaceous material is burned, any adsorbed hydrocarbons are also burned and lost. In some cases too much heat is produced in the regeneration zone by large deposits of coke or carbonaceous material on the catalyst particles, and where these catalyst particles also contain adsorbed oil, it is necessary to control the temperature during regeneration to avoid overheating of the catalyst particles. Also by having the adsorbed oil on the catalyst particles going to the regenerator, the time of regeneration is longer because it is necessary to burn more combustible material in the regeneration zone.

To remove the adsorbed hydrocarbons I have provided a stripping zone 46 arranged in the bottom portion of the vessel 10 and a passageway 48 leading from the bottom of the reaction vessel 10 to the stripping zone 46. The relatively narrow passageway 48 is bounded on one side by collar or annular flange 52 which is attached to the lower part of the grid member 32 and which has a smaller diameter than the inner wall of the vessel 10. The relatively narrow passageway 48 is formed between the collar or flange 52 and the wall 54 of the reaction vessel 10.

In order to prevent the entrainment of oil vapors in large masses of agglomerated catalyst particles entering the stripping zone, the catalyst is dispersed before it enters the stripping zone. The narrow passageway 48 is provided with annular baffles 56 which are arranged in step formation or in a Jacob's ladder. By providing the narrow passageway 48, a stripping gas may be passed in contact with the spent catalyst at an increased velocity to disperse the catalyst particles or to break up any agglomerates. By providing the annular baffles 56 in the passageway 48, additional mixing between the stripping gas and the fouled or spent catalyst is obtained. Stripping gas may be introduced into the bottom portion of the passageway 48 through inlet lines 62 which are shown at opposite sides of the reaction vessel 10. Preferably at least four of these inlet lines are used but more or less of them may be used as desired.

The stripping gas introduced through lines 62 passes upwardly through the narrow passageway 48 at a much higher velocity than the vapors and gases pass through the dense fluidized bed 34 of catalyst in the reaction vessel 10. However, the velocity of the stripping gas is so selected that downward flow of the spent catalyst from the mass 34 is not prevented. For example, when using steam as a stripping gas, the velocity may be as high as 3 ft./second at 150 lbs. per minute per square foot of downward catalyst flow when using synthetic silica alumina catalyst of 200 to 400 standard mesh and 14% 0 to 20 micron particles. Under these conditions, the spent or fouled catalyst will flow downwardly through the passageway 48 to main stripping zone 46.

Instead of using baffles 56, the passageway may be provided with other constrictions such as spaced perforated plates.

The narrow passageway 48 conducts the spent or fouled catalyst particles to the stripping zone 46. The stripping zone 46 is formed by a conical false bottom 64 provided with openings 65. The false bottom 64 is spaced as at 65' from the conical bottom 66 of the reaction vessel 10. One or more inlet lines 68 are provided for the introduction of stripping gas, such as steam, light hydrocarbon gas or inert gas, into the space 65' beneath the false bottom 64. The introduced stripping gas has a lower velocity in the stripping zone 46 than in the narrow passageway 48. Because of the lower velocity, the density of the fluidized catalyst particles being stripped in the stripping zone 46 is relatively high. The density of the fluidized mixture undergoing stripping when using silica alumina synthetic gel in powdered form is about 20 lbs./cu. ft. to 40 lbs./cu. ft. Also, because the velocity in the stripping zone 46 is low, the steam or stripping gas consumption will be low, thus effecting considerable economy.

I have found that improved results are obtained in the stripping zone when there is a certain relationship between the size and number of the holes and the cross-sectional stripping area. With the holes of about 0.007 sq. ft. in cross-sectional area, at least one hole per square foot of cross-sectional stripping area is preferred. The area of the holes may vary from about 0.005 to 0.02 sq. ft. The velocity of the stripping gas passing through the stripping zone 46 is about 0.5 ft./second to 1.5 ft./second. The holes 65 ensure uniform distribution of the stripping gas.

In the form of the invention shown in Fig. 1 of the drawing, the adsorbed hydrocarbons are removed from the spent or fouled catalyst particles in the stripping zone 46 and pass upwardly with the stripping gas through passageway 48 and into the reaction vessel 10 where the separated hydrocarbons are further converted to lower boiling hydrocarbons.

Instead of introducing a mixture of catalyst particles and reactants into the reaction vessel 10 as shown in Fig. 1 by means of line 16, the catalyst particles and reactants may be separately introduced into the reaction vessel 10.

Figure 3:
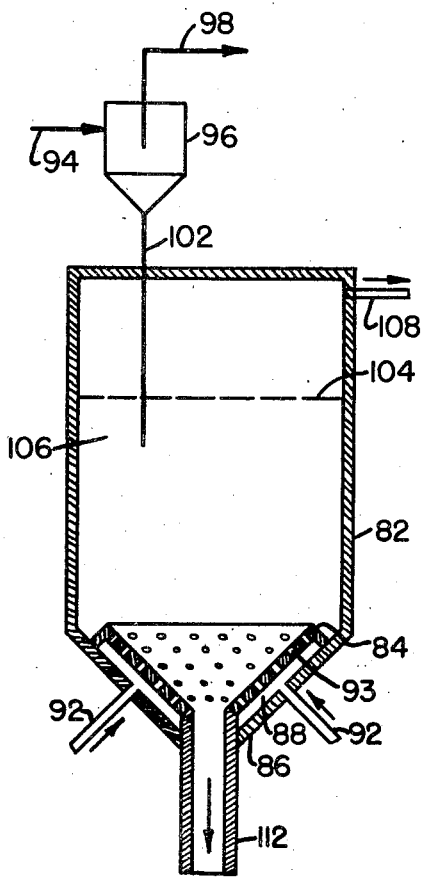
Fig. 3 represents another form of my invention including a vessel provided with a stripping zone at its lower portion.

Referring now to Fig. 3, the reference character 82 designates a vessel provided with a perforated false bottom 84 similar to the false bottom 64 described in connection with Fig. 1. The false bottom is arranged at a distance from the conical bottom 86 of the vessel 82 and forms a space 88 into which stripping gas is introduced through line or lines 92. The conical false bottom 84 is provided with openings or holes 93. The conical bottom and conical false bottom shown in Fig. 3 functions in substantially the same way as the same construction does in Fig. 1 and further description of this construction is not necessary.

In Fig. 3 the narrow passageway shown at 48 in Fig. 1 has been omitted. The vessel 82 may be a reaction vessel similar to that shown in Fig. 1 wherein catalyst or contact particles and reactants are introduced into the vessel and maintained as a relatively dense dry fluidized mixture in which vaporous reaction products pass overhead and fouled or spent catalyst is withdrawn in a relatively dense condition from the bottom of the vessel.

As shown in Fig. 3, the vessel 82 is a stripping vessel or hopper provided with a bottom stripping zone comprising the false bottom 84. The reaction products in vapor form containing entrained catalyst particles are passed through line 94 to separating means 96 in which the catalyst particles are separated from vaporous reaction products. The vaporous reaction products pass overhead through line 98 from the separating means and to any desired separating equipment such as a fractionating equipment.

The separated catalyst particles are collected in the separating means 96 and are passed through line 102 to vessel 82 below the level 104 of fluidized powdered solids 106. In this form of the invention the stripping gas introduced through line or lines 92 is selected to maintain the catalyst particles in a relatively dense condition having many of the properties of a liquid and similar to that described in connection with the bed 34 in Fig. 1.

Stripping gas passing upwardly through the bed 106 is released from the vessel 82 through line 108. Stripped catalyst particles are withdrawn in a relatively dense condition from the bottom of the vessel 82 through line 112 which forms the upper portion of a standpipe for developing hydrostatic pressure needed for recirculating the catalyst or for passing it to a regeneration zone. Gas passing through line 108 contains entrained catalyst and may be passed to separator 96 via line 94 to recover catalyst.

Instead of passing the reaction products and spent catalyst to separator 96, the hopper or vessel 82 may be arranged below a reaction vessel (not shown) so that spent catalyst in a more or less dense phase is passed directly from the reaction zone into hopper or vessel 82.

In the form of the invention shown in Fig. 3, the holes or perforations 93 in the false bottom 84 have an area of about 0.007 square foot and the velocity of the stripping gas passing upwardly through the fluidized bed 106 is about 0.5 foot per second to 1.5 feet per second. For best stripping results, at least one hole or opening per square foot of cross-sectional stripping area is required.

The following data show the improvement resulting from increasing the stripping gas velocity at the entrance to the stripping zone. Both sets of data were obtained at 0.6 ft./sec. velocity and 0.5 minute in the main portion of the stripping zone, but in the latter case the velocity was 2.1 ft./sec. in the entrance to the stripping zone.

| Velocity at Entrance | 0.6 ft./sec. | 2.1 ft./sec. |
|---|---|---|
| Per cent Strippable Hydrocarbon remaining on Catalyst | 0.12 | 0.04 |

My invention is especially adapted for removing hydrocarbon vapors from spent catalyst particles but may also be used for stripping reactants from catalyst particles following a catalytic reaction.

While I have shown different embodiments of my invention, it is to be understood that these are by way of illustration only, and various changes and modifications may be made without departing from the spirit of my invention.

I claim:

1. A method of converting hydrocarbons which comprises introducing divided catalyst particles and hydrocarbons into a reaction zone, contacting the catalyst particles with hydrocarbon vapors in said reaction zone and forming a relatively dense dry fluidized mixture having a level in said reaction zone, flowing fouled catalyst particles in a dry fluidized condition from the bottom of said reaction zone into a restricted passageway, continuously introducing a gas into the bottom portion of said passageway so that the gas flows upwardly countercurrent at a relatively high velocity to the downflowing catalyst particles, then passing the catalyst particles into an enlarged stripping zone, introducing stripping gas into the bottom portion of said enlarged zone at a plurality of points and at a lower velocity than in said passageway to remove hydrocarbon vapors from the fouled catalyst particles, passing the last mentioned removed hydrocarbons from said stripping zone and withdrawing stripped catalyst from the bottom portion of said enlarged zone.

2. A method according to claim 1 wherein the stripping gas is introduced into said enlarged zone through a plurality of ports which are arranged so that there is at least one port per square foot of cross-sectional stripping area.

3. A method according to claim 1 wherein the stripping gas is introduced into said enlarged zone through a plurality of ports which are arranged so that there is about one port per square foot of cross-sectional stripping area and the port has an area of about 0.007 square foot.

4. An apparatus of the character described including a vessel provided with a top outlet and a bottom outlet, means for introducing a fluid and divided contact particles into said vessel, said means including a grid member spaced from the inner wall of said vessel to provide a passageway, a stripping section in said vessel and below said grid member, baffles in said passageway, said passageway forming part of the stripping section, said stripping section including a false perforated bottom for introducing stripping gas into said stripping section and means for introducing gas beneath said false perforated bottom and into said stripping section.

5. An apparatus according to claim 4 wherein each opening in said perforated false bottom has an area of about 0.005 to 0.02 square foot and about one opening is provided per square foot of cross-sectional stripping area.

ROBERT W. KREBS.

REFERENCES CITED

The following references are of record in the file of this patent:

UNITED STATES PATENTS

| Number | Name | Date |
|---|---|---|
| 1,334,235 | Eckhardt | Mar. 16, 1920 |
| 2,079,158 | DeRachat | May 4, 1937 |
| 2,239,801 | Voorhees | Apr. 29, 1941 |
| 2,310,377 | Voorhees | Feb. 9, 1943 |
| 2,316,195 | Troxler | Apr. 13, 1943 |
| 2,320,318 | Simpson et al. | May 25, 1943 |
| 2,336,017 | Jewell et al. | Dec. 7, 1943 |
| 2,337,684 | Scheineman | Dec. 28, 1943 |
| 2,340,878 | Holt et al. | Feb. 8, 1944 |
| 2,367,281 | Johnson | Sept. 30, 1941 |
| 2,367,694 | Snuggs | Jan. 23, 1945 |
| 2,391,944 | Carlsmith | Jan. 1, 1946 |
| 2,394,814 | Snuggs II | Feb. 12, 1946 |